Sept. 18, 1928.
R. G. TUGENDHAT
1,684,751
BAKING APPARATUS
Filed Dec. 18, 1923   2 Sheets-Sheet 1
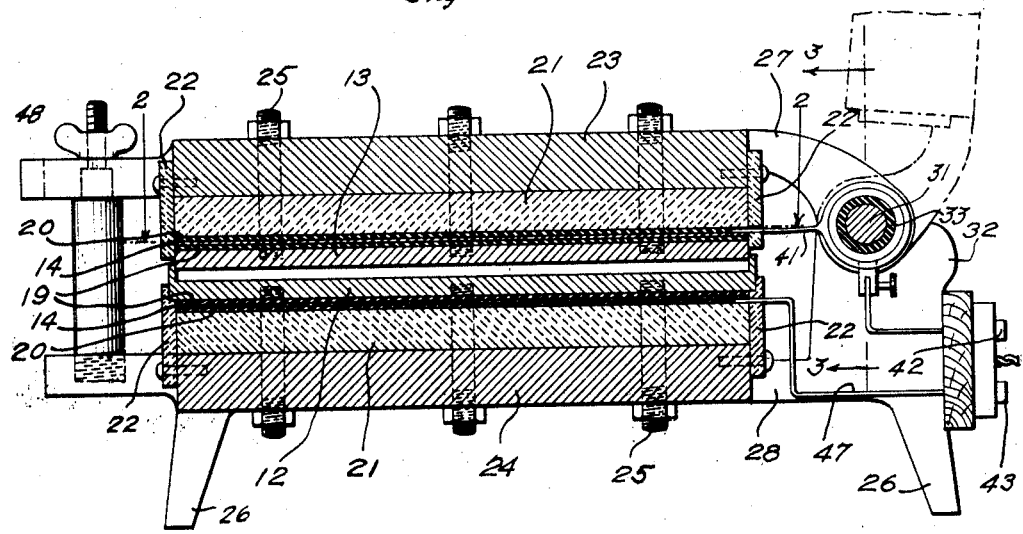
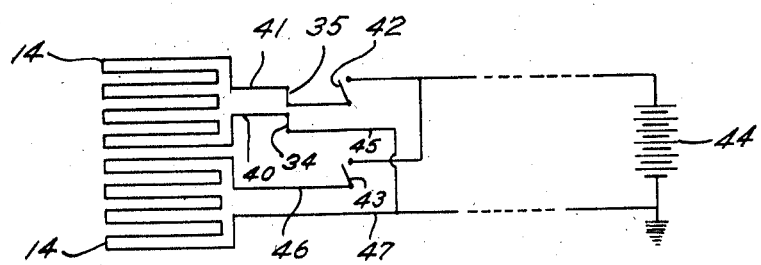
INVENTOR
ROBERT G. TUGENDHAT
BY
Newell + Spencer
ATTORNEYS Sept. 18, 1928.
R. G. TUGENDHAT
BAKING APPARATUS
Filed Dec. 18, 1923
1,684,751
2 Sheets-Sheet 2
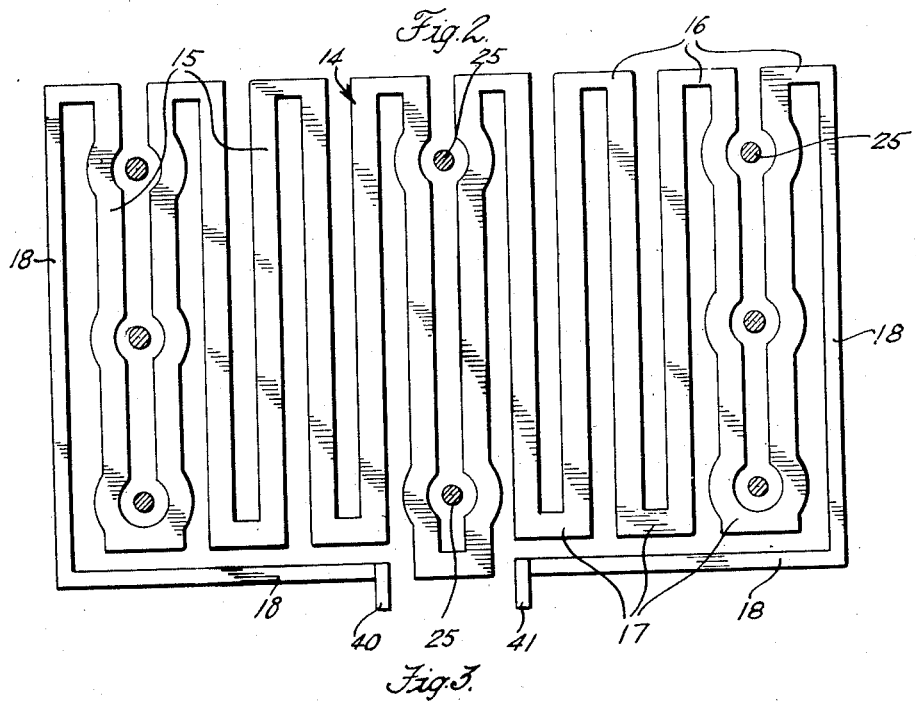
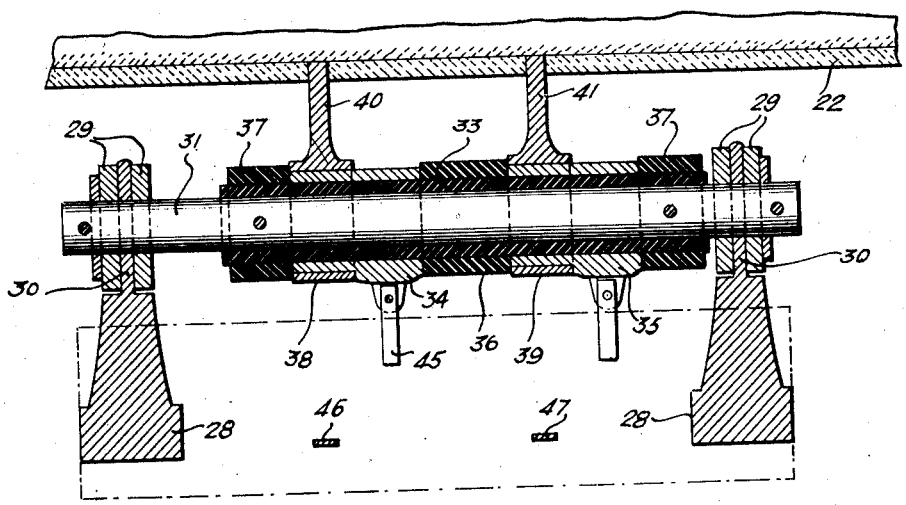
INVENTOR
ROBERT G. TUGENDHAT.
BY
Newell & Spencer
ATTORNEYS Patented Sept. 18, 1928.

1,684,751

UNITED STATES PATENT OFFICE.

ROBERT G. TUGENDHAT, OF SAGINAW, MICHIGAN, ASSIGNOR, BY MESNE ASSIGNMENTS, TO BAKER PERKINS COMPANY, INC., OF SAGINAW, MICHIGAN, A CORPORATION OF NEW YORK.

BAKING APPARATUS.

Application filed December 18, 1923. Serial No. 681,329.

My invention relates to baking apparatus and more particularly to electrically heated baking machines used in the production of wafers and the like.

One object of my invention is to provide apparatus in which the baking pans may be of any desired size, and in which the supply of heat to the lids may be controlled independently of the supply of heat to the pans.

Another object is to provide baking apparatus in which very great economy in the use of power is possible, the heat being produced only when needed and concentrated where needed, thus minimizing waste and preventing the heating of the surroundings to any great extent.

Other objects will become apparent as the description progresses.

In the accompanying drawings which illustrate preferred embodiments of the invention:

Figure 1 is a vertical transverse section of a baking apparatus mounted on a stationary base;

Fig. 2 is a partial horizontal section on the line 2—2 of Figure 1 showing a heater element;

Fig. 3 is a section on the line 3—3 of Fig. 1 through the hinge, the cover being raised;

Fig. 4 is a diagram of a circuit for the heating elements.

Referring now to the construction shown in Figures 1 to 4, I provide a batter pan 12 consisting of a plate of suitable heat conducting material such as metal, and having a flange or rim around its margin to hold the batter to be baked. A second plate 13 fits over the pan 12 to serve as a lid. To enable very rapid baking I prefer to heat both the pan and the cover, and for compactness I use as heating elements resistors 14 composed of sheets of relatively thin gage resistance metal such as a nickel chromium alloy. To heat the entire baking surface of the plates, I make the resistor approximately coextensive with the surface thereof, while to insure uniform distribution of the heat I cut or otherwise form the resistor element into a continuous strip which extends back and forth across the plate to be heated in approximately parallel sections 15, connected at opposite ends by portions 16 and 17. For convenience in making connection to the heater, I prefer to bring the opposite ends of the heater strip nearly to the midpoint of one edge of the plate. To compensate for the greater loss of heat at the edges of the plate than in the central portion, I make the peripheral portions 16 and 18 of the heater strip of smaller cross section than the interior portions 15 and 17, so that extra heat is produced near the edges and the heat reaching the edges of the baking surface will be substantially as great as that at other points.

When the baking plates are metal, I interpose an electrical insulating element 19, such as a sheet of mica, between the heaters 14 and the plates. I may also cover the outer surface of each heater with an insulating sheet 20. I confine the heat to the baking surfaces by covering the outside of the heaters with heat insulating material such as asbestos boards 21 of suitable thickness, while the edges are covered by somewhat thinner boards 22 of the same material. The pan and heater elements are assembled as units on bases 23 and 24, and are held together by suitable means such as the bolts and nuts 25. The heater strips 15 may be offset, as shown in Fig. 2, to provide ample clearance for the fastening bolts.

The base 24 stands on legs 26 when the apparatus is to be stationary, while it is equally adapted to be mounted on wheels when moving apparatus is desired. In any case the lid base 23 will be hinged to the pan base 24 in some convenient manner, for example as shown in Figs. 1 and 3. In this construction brackets 27 extending rearwardly from the base 23 terminate in hinge ears 29 adapted to cooperate with similar ears 30 on the upright portions of the extensions 28 of the base 24. The ears 29 and 30 are pivotally connected by a hinge pin 31 held in place as by the washers and pins shown. Stop lugs 32 limit opening movement of the lid.

In baking apparatus of the type disclosed, the time required to bake each batch of batter is very short, so that the lids are opened and closed frequently. Even highly flexible conductors carrying current to the lid heater would soon wear out in this service, and I therefore provide hinges in the lid conductors to permit movement of the lid without wear on the conductors. I prefer to mount these conductor hinges on the pin 31 to which the lid as a whole is pivoted, first placing an insulating sleeve 33 over the pin when it is made of conducting material. On the sleeve 33 I mount conducting cylinders 34 and 35 which I separate by an insulating spacer 36 and retain against longitudinal movement by rings 37 and pins as shown. Sleeve contacts 38, 39 are journalled on the cylinders 34 and 35 respectively. Movement of sleeve 38 is limited by abutment against the adjacent ring 37 and a lug on contact 34, while spacer 36 and a lug on contact 35 perform the same function for sleeve 39. Conducting straps 40 and 41 connect sleeve contacts 38 and 39 respectively to opposite ends of the lid heater element 14.

To provide for independent control of the circuits for the lid and pan heaters, I place two switches 42, 43 convenient to the baking apparatus, mounting them for example on the rear of the base bracket 28 as shown in Fig. 1. I may then connect one of the cylinders, as 35 to one side of switch 42, the other cylinder 34 being directly connected by a conductor 45 to the grounded pole of a source of power indicated in Fig. 4 by the battery 44. Similarly one terminal of the pan heating element 14 is connected by a conductor 46 to one side of switch 43, while a conductor 47 connects the other terminal of the pan heater to the grounded side of the battery. Obviously by connecting the switches 42 and 43 to the free pole of battery, the lid heater may be energized by closing switch 42, while the pan heater is under control of switch 43. This arrangement permits perfect baking of the batter in the pan.

I provide the usual or any desired form of lock to hold the lid closed during baking, indicated at 48 in Figure 1.

My construction permits great economy in the power consumed, since the current is used only during the baking operation, and owing to the insulation of the pans the temperature of the room in which the apparatus is located need not be unduly high as is ordinarily the case with baking machines as heretofore constructed. The construction is also economical to maintain since the wearing parts are all arranged for easy replacement. It should be understood that I do not wish to limit my invention to the specific details described since various substitutions of parts may be made within the scope of the invention as defined in the claims.

What I claim as new is—

1. In a baking apparatus, the combination with a plate for material to be baked, of a heating element approximately coextensive with the plate and of such cross-section as to give a greater heat around the edges of the plate than in the center whereby the plate may be heated uniformly.

2. In a baking apparatus, the combination with a plate for material to be baked, of a heating element approximately coextensive with said plate and of such cross-section as to deliver a greater amount of heat at the edges of the plate than in the center, a base support for said plate, heat insulating covering between the plate and base support, and heat insulating covering surrounding the edges of the plate.

3. In baking apparatus, the combination with a plate for material to be baked, of a heating element comprising a strip of resistance metal extending back and forth across the plate in approximately parallel evenly spaced sections having connecting portions at their opposite ends, the strip extending over substantially the entire surface of the plate, and the portions of the strip near the edges of the plate being of smaller cross sectional area than the central portions thereof, whereby the plate may be heated uniformly by current flowing through the strip.

4. In baking apparatus the combination with a baking pan, a lid therefor, hinge elements including a hinge pin to connect the lid to the pan, and a heating resistor mounted on the lid and having two terminals, of two conducting cylinders mounted on the hinge pin, an insulating spacer to separate said cylinders, a sleeve contact journalled on each of said cylinders, conducting straps connecting opposite terminals of the resistor to the opposite sleeve contacts, and means for connecting a source of power to the conducting cylinders, whereby the lid may be moved relative to the pan and the conductors will remain unflexed during such movement.

Signed at Saginaw, Michigan, this 30th day of November, 1923.

ROBERT G. TUGENDHAT.